United States Patent [19]

Loebig

[11] Patent Number: 5,436,915
[45] Date of Patent: Jul. 25, 1995

[54] BIT ERROR REDUCTION BY USING CHECKSUMS IN A SWITCHING NETWORK IMPLEMENTED AS TRIPLETS

[75] Inventor: Norbert Loebig, Darmstadt, Germany

[73] Assignee: Siemens Aktiengesellschaft, Munich, Germany

[21] Appl. No.: 953,223

[22] Filed: Sep. 30, 1992

[30] Foreign Application Priority Data

Sep. 30, 1991 [DE] Germany .............. 41 32 552.4

[51] Int. Cl.$^6$ .............. H04Q 1/24; H04Q 11/04
[52] U.S. Cl. .............. 371/36; 371/8.2; 371/68.2
[58] Field of Search .............. 371/5.1, 5.5, 8.2, 36, 371/49.1, 68.2

[56] References Cited

U.S. PATENT DOCUMENTS

| | | | |
|---|---|---|---|
| 4,543,651 | 9/1985 | Chang | 370/16 |
| 4,995,042 | 2/1991 | Guthaus | 371/68.2 |
| 5,012,465 | 4/1991 | Helou et al. | 370/58.1 |
| 5,084,878 | 1/1992 | Kanekawa et al. | 371/36 |

FOREIGN PATENT DOCUMENTS

| | | |
|---|---|---|
| A0321426 | 6/1989 | European Pat. Off. . |
| A0325318 | 7/1989 | European Pat. Off. . |
| A0381104 | 8/1990 | European Pat. Off. . |
| A0403451 | 12/1990 | European Pat. Off. . |
| 2427668A1 | 6/1974 | Germany . |
| A2718317 | 11/1978 | Germany . |
| 3821871 | 6/1988 | Germany . |
| A8501410 | 3/1985 | WIPO . |
| A8803738 | 5/1988 | WIPO . |
| A8906084 | 6/1989 | WIPO . |
| A9016132 | 12/1990 | WIPO . |

OTHER PUBLICATIONS

K. Steinbuch, *Tashenbuch der Nachrichtenverarbeitung* (Springer–Verlag, 1962), pp. 92–93, 154–155.
Patent Abstracts of Japan, vol. 009, No. 123 (E–317), May, 1985, JP-A-60 010 996 (Matsushita), Jan. 21, 1985.

*Primary Examiner*—Stephen M. Baker
*Attorney, Agent, or Firm*—Hill, Steadman & Simpson

[57] ABSTRACT

A method for reducing bit error in a digital communications system including the step of identifying whether a data or information word was correctly switched through a network having at least three switching levels after the data word has been switched by undertaking a parity bit check as well as a bit by bit comparison of the bits in the data word, and an apparatus configured to perform the method. Bit errors are corrected either on the basis of majority decision or by a Statistical evaluation of the bit error rates of the various switching levels of the switching network.

12 Claims, 4 Drawing Sheets

FIG 4

BIT ERROR REDUCTION BY USING CHECKSUMS IN A SWITCHING NETWORK IMPLEMENTED AS TRIPLETS

BACKGROUND OF THE INVENTION

The invention generally relates to methods of reducing bit errors in digital communication systems. More specifically, the invention relates to methods for reducing bit error in digital communication systems such as that disclosed by German patent DE-PS 38 21 871 C2, the teachings of which are fully incorporated herein by reference.

Analog and digital transmission methods employed on lines and cables for data transmission are known to be susceptible to disturbing external influences, for example, electromagnetic field influences, that can modify data or information being transmitted thereover. For example, one or more bits of digital data or information can be "turned around" or otherwise altered during transmission. These alterations of the bits are known as bit errors.

Because international long distance information transmission systems are particularly susceptible to bit errors, international standardization committees, such as, for example, the CCITT have established minimum rules for bit error rates.

Generally, these systems include transmission links, every transmission link being composed of two parts:
(A) one part which is a path and relates to the transmission of the information over a physical distance between two nodes. These paths increasingly are being realized with optical communications cables.
(B) another part is a switching network which relates to the through-connection of the information in the respective nodes wherein communications systems are installed.

Optical transmission links are far less susceptible to the above mentioned external influences, so that transmission reliability is extremely high given the employment of optical transmission links. As a result, by employing optical transmission systems, potential disturbing influences have been decisively reduced in the transmission parts of these systems. However, by contrast thereto, bit errors frequently occur during the through-switching events in the switching networks of these communications systems.

Due to their central significance for the network nodes, these switching networks are usually implemented in levels such as pairs or triplets, this giving rise to a redundancy which is used to assure continued connection through a network. Given a malfunction of one switching network level, this makes it possible to through-connect a bit stream over another switching network level. This is particularly true given a total outage of a switching network level.

However, bit falsifications during the through-connection of a bit stream which, for example, are produced by aging individual components can be problematical. Such errors are difficult to analyze and eliminate since they have no influence whatsoever on the function of the switching network as a through-switching unit.

Error recognition methods for recognizing and correcting bit errors in switching networks are known and are, for example, realized in the form of methods for monitoring of check sum information co-transmitted with the data words. German published application DE-OS 24 27 668, having corresponding United Kingdom patent application GB 1 447 713, the teachings of which are fully incorporated herein by reference, discloses such a method wherein an additional parity bit is attached to each data or information word in each channel before the actual through-switching event in the switching network, an information word generally comprised of bits.

In general, a parity bit represents the binary check sum of the individual bits of the corresponding data information word or inversion thereof. A parity bit is a self-checking code that is attached to a set of data bits (a word); the parity bit being set so that the sum of the one's bits is always odd (odd parity) or even (even parity). After the through-switching event, the binary check sum of the through-connected word is again calculated and is compared to the transmitted parity bit. When the co-transmitted and the newly calculated parity bits deviate from one another, there is a transmission error recognized that is retained in a corresponding table memory.

As a result, statistical statements about the condition of the corresponding switching network levels can be made over specific time spans. With these a switching network level error rate in the past preferably can be employed for through-connection of the bit streams. A comparable method is also disclosed by German patent DE-PS 38 21 871 C2, the teachings of which are incorporated herein by reference.

One problem that arises in these methods, however, is that the falsification of an even number of bits in an information word is not recognized as a bit error since the parity calculation at the output side of a switching network level leads to the same result as the parity calculated at the input side. Although statistical statements about the quality of a through-connection of the data or information words can be made given recognized bit errors, the bit error remains uncorrected and is thus forwarded to the destination subscriber in erroneous form. This procedure harbors serious deficiencies insofar as additional bit errors can be incurred and add up in further network nodes.

SUMMARY OF THE INVENTION

The invention provides a method wherein the influences of bit errors in the switching networks of digital communications systems are kept as low as possible. To this end, the invention provides a method wherein a data stream of words is transmitted in parallel over a plurality of network levels, each of the parallel transmitted words of the data stream being compared bit by bit with the co-transmitted words, and then in accordance with certain rules, one of the parallel words is transmitted out of the switching node.

In an embodiment, the invention provides a method for reducing bit errors in a digital communications system having a switching network with at least three (3) switching network levels operatively disposed between interface elements that calculate a check sum both prior to and following switching through of a data word, comprising the steps of:
  calculating a check sum for a data word to be through-connected over the network;
  forming check sum information for the data word and associating the check sum information with the data word;

providing identical versions of the data word and its associated check sum information to each of the three switching network levels;

through connecting the three versions in parallel;

calculating a second check sum for each through-connected version of the data word;

comparing each second check sum of each through-connected version of the data word with its respective through-connected check sum information;

acquiring and maintaining statistical information regarding differences between the second check sum of each through-connected version of the data word its respective through-connected check sum information;

comparing each data bit of each through-connected version of the data word with the respective data bits of the other through-connected versions of the data word; and given only a first through-connected version whose second check sum is in agreement with its through-connected check sum information while the other second and third through-connected versions of the data word are identical but differ with respect to only one data bit from the first through-connected version of the data word, transmitting as an output data word from the switching network that first through-connected version of the data word; or given first and second through-connected versions of the data word whose second check sums are in agreement with their through-connected check sum information but which differ from each other with respect to exactly two data bits and the third through-connected version of the data word differs from each of the two through-connected versions of the data word in one of these two data bits and whose second check sum is inconsistent with its respective through-connected check sum information, transmitting as an output word of the switching network that one of the first and second through-connected versions of the data word whose respective switching network level has exhibited the lowest bit error; or given first and second through-connected versions of the data word whose second check sums are in agreement with their through-connected check sum information but which differ in exactly one data bit position with respect to each other while the third through-connected version of the data word has a second check sum that is inconsistent with its respective through-connected check sum information but is otherwise identical to one of the first and second through-connected versions of the data word, transmitting as an output word of the switching network that one of the first and second versions whose respective switching network level has exhibited the lowest bit error; or transmitting as an output word of the switching network a composite version of the three through-connected versions of the data word wherein each bit of the composite word is determined by a majority decision of the respective bits of the three versions of the through-connected data word.

In an embodiment, the invention provides that the check sum information is parity information.

The invention can be employed in switching networks that comprise more than doubly implemented, respectively activated, switching network levels. What is important is the branching of a data stream into a plurality of completely identical parallel information streams into the like number of parallel through connections over each of the respectively activated switching network levels. First, this enables an evaluation of the parity bits at the output side of each and every through connection as well as bit by bit comparison of all of the data words. Such a combined check usually allows unambiguous conclusions about potentially occurring bit errors and allows correct information words to be forwarded to the destination subscriber. As a result, an extremely low error rate is achieved in the network nodes, a fact that is especially relevant and important given the employment of optical transmission links between network nodes.

For simple error situations, the identification of the information word to be output occurs by means of bit by bit application of the principal of majority decision on the basis of three information words through-connected in parallel. Especially complex error situations can be handled in a divergent way. The principal of a majority decision is described in detail in K. Steinbuch, *Taschenbuch der Nachrichtenverarbeitung* (Springer-Verlag 1962), the teachings of which are fully incorporated wherein by reference.

These and other features of the invention will become clear below with reference to the following detailed description of the presently preferred embodiments with reference to the accompanying drawings.

DETAILED DESCRIPTION OF THE PRESENTLY PREFERRED EMBODIMENTS

As set forth above, the present invention provides for a method for reducing bit errors in data communication systems. To that end, the invention provides a method for evaluating data words during their transmission through the switching levels of a switching network.

Figure 1:
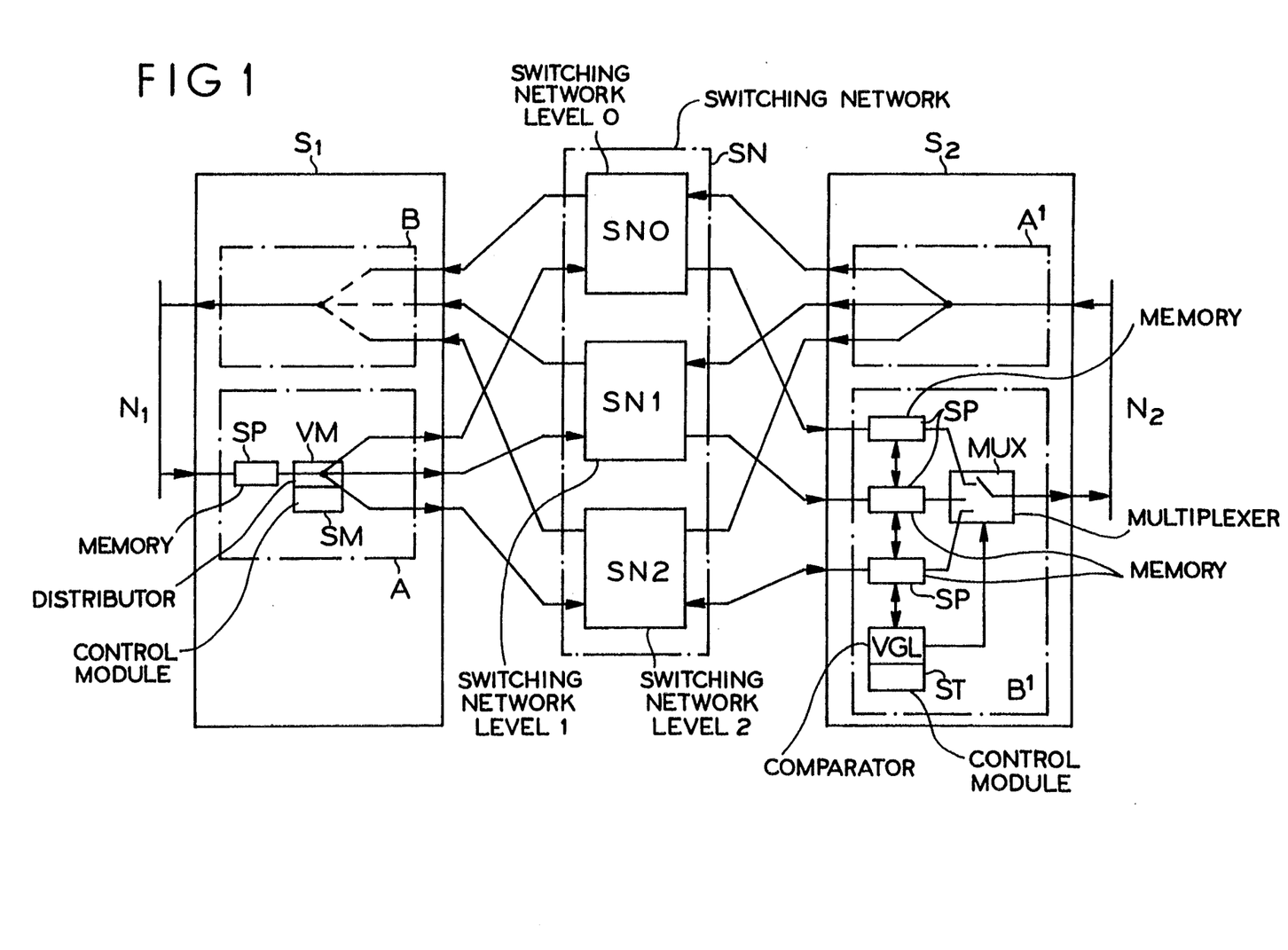
FIG. 1 illustrates a switching network with three switching levels.

In FIG. 1, there is illustrated a switching network SN coupled between transmission lines N1 and N2 of a communication network N. As illustrated, the switching network SN is disposed between two interface units S1 and S2 which are respectively connected to ends of the transmission elements N1 and N2 of the network N.

The switching network SN is comprised of three switching network levels SN0, SN1, and SN2. The switching network levels SN0, SN1, and SN2 are connected in parallel between the transmission lines N1 and N2 of the communication network N via the interface elements S1 and S2.

As further illustrated, the interface elements S1 and S2 contain logic elements A and A' respectively, as well as logic elements B and B' respectively In the description below, reference will only be made to the elements A and B'; however it is to be understood that the elements B and A' preferably are configured identically to their respective counterparts A and B'.

The logic elements A and A' contain memory elements SP, distributor modules VM and control modules SM. An information or data word transmitted from element A to element B' is briefly intermediately stored in the memory element SP in the logic element A. As is known, the calculation of the parity bit occurs therein. Subsequently, the information or data word together with its calculated parity bit is provided in parallel onto the switching network levels SN0, SN1, and SN2 via the distributor module VM. This operation is controlled and monitored by the control module SM.

After the through-switching event across the respective switching network levels SN0, SN1, and SN2, the through-connected information or data words are evaluated in the logic elements B or B' for bit errors that may have arisen during the through-switching event. To this end, the elements B and B' contain memory SB, comparator elements VGL, control elements ST, as well as multiplexer elements MUX.

Preferably, each of the memory elements SP implements an intermediate storage of brief duration of the through-connected information words; a bit-by-bit formation of the differences of the separately through-connected information or data words subsequently occurring with the comparator elements VGL, as well as another parity bit calculation per information or data word and switching network level. The result of this parity calculation is compared to that of the co-transmitted parity bit per switching network level. This operation is controlled and monitored by control elements ST.

For bit error recognition, the information or data words that were transmitted through the switching network levels SN0, SN1, and SN2 are compared to one another bit by bit and, second, a parity test of the three through-connected information or data words is undertaken. The result of these evaluations is retained by known statistical evaluation procedures represented herein by the function f(s). Due to the inclusion of the statistical evaluation procedure f(s), statistical statements about the quality of the through connections across the respective switching network levels SN0, SN1, and SN2 can be made at a later point in time.

The following symbols are used herein for ease of understanding of the principles of the invention:

"I" represents a data word which preferably comprises 8 bits; and

"P" represents a parity bit which is co-transmitted with the data word I through a switching network level.

There are at least four situations of concern that can be distinguished when data words are transmitted via the network illustrated in FIG. 1 in accordance with the principles of the invention. After the through connections the four situations that can arise are as follows:

Case 1

Two data or information words $I^{(x)}$ and $I^{(y)}$ that were transmitted via the two switching network levels $SN_x$ and $SN_y$ ($y \neq x$) respectively, are identical but these data words do not match or otherwise are not consistent with their respectively co-transmitted parity bits $p^{(x)}$ and . A third data or information word $I^{(z)}$ ($z \neq x$ and $z \neq y$) that was transmitted across a third switching network level $SN_z$ differs from the other two data or information words $I^{(x)}$ and $I^{(y)}$ in terms of only one bit and its parity matches or is otherwise consistent with its co-transmitted parity bit $p^{(z)}$. Then, in accordance with principles of the invention, the data or information word having consistent parity information, ie. data or information word $I^{(z)}$, is chosen to be forwarded to the destination subscriber.

Case 2

The two data or information words $I^{(x)}$ and $I^{(y)}$ ($x \neq y$) which were transmitted across the two switching network levels $SN_x$ and $SN_y$ respectively, have parities which are consistent with their respectively co-transmitted parity bits P(x) and, but differ in terms of precisely two bits. The third data or information word $I^{(z)}$ ($z \neq x$ and $z \neq y$) that was transmitted via the switching network level $SN_z$ and has a parity which is inconsistent with or otherwise does not match its respectively co-transmitted parity bit $p^{(z)}$ and differs from $I^{(x)}$ and $I^{(y)}$ in exactly only one of these two bits. Then, in accordance with the principles of the invention, either the data or information word $I^{(x)}$ or $I^{(y)}$ will be forwarded to the destination subscriber depending on the statistical evaluation procedure f(s). That is to say, if the switching network level over which either $I^{(x)}$ or $I^{(y)}$ was transmitted enjoys a lower error rate, than the word transmitted over that switching network level will be forwarded to the destination subscriber.

Case 3

The data or information words $I^{(x)}$ or $I^{(y)}$ ($x \neq y$) that were transmitted across the switching network levels $SN_x$ and $SN_y$, respectively, have parities which are consistent with or otherwise a match their respectively co-transmitted parity bits $p^{(x)}$ and $p^{(y)}$, but otherwise differ in exactly one bit and the data or information word $I^{(z)}$ ($z \neq x$ and $z \neq y$) that was transmitted across the switching network level $SN_z$ has a parity that is inconsistent with or otherwise does not match its co-transmitted parity bit $p^{(z)}$ but otherwise the word $I^{(z)}$ is identical with $I^{(x)}$ or $I^{(y)}$ then the forwarding of either the information word $I^{(x)}$ or $I^{(y)}$ to the destination subscriber will ensue depending on the statistical evaluation of the switching network levels over which those words are transmitted. In this regard, the data or information word $I^{(x)}$ or $I^{(y)}$ transmitted over the switching network level having the lowest error rate or error statistics will be forwarded to the destination subscriber.

Case 4

In all other instances, the decision to forward a data or information word that is provided to the destination subscriber is formed bit by bit from the three data or information word $I^{(x)}$, $I^{(y)}$ and $I^{(z)}$ ($x \neq y \neq z$) according to the principles of majority decision described in the above described book by K. Steinbuch.

It can be appreciated that the evaluation procedure f(s) carries statistical data about the quality of the through switching events of the three switching network levels SN0, SN1 and SN2. These statistical data are updated when unambiguously assignable bit errors are recognized. Thus, in doubtful cases or situations, the data or information word of that switching network level that had the lowest bit error rate in the past is forwarded or otherwise transmitted to the destination subscriber.

It can be appreciated that an especially simple embodiment of the invention can be configured if only the first and fourth cases or situations are taken into consideration. It is understood that this means that no static statistical function f(s) is defined in this simple embodiment.

Figure 2:
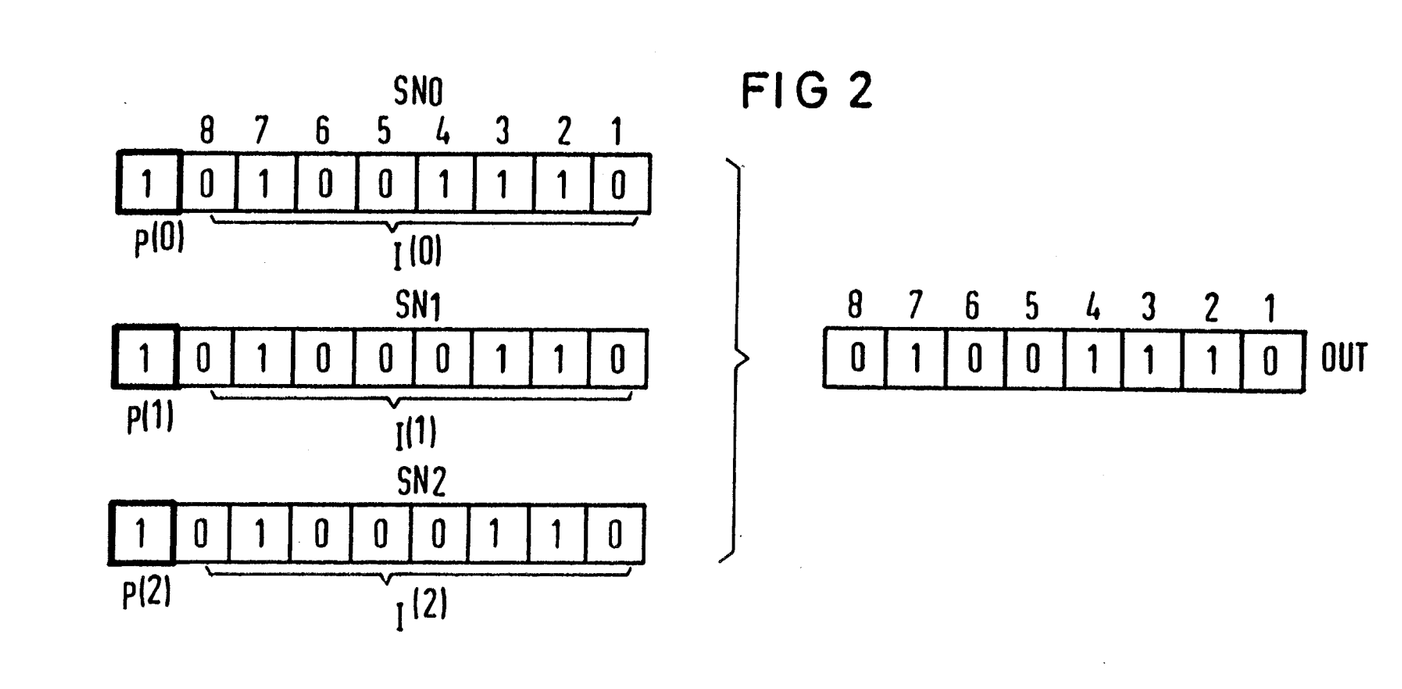
FIG. 2 illustrates a first exemplary transmission of an 8 bit word through the switching levels of the switching network of FIG. 1.
Figure 3:
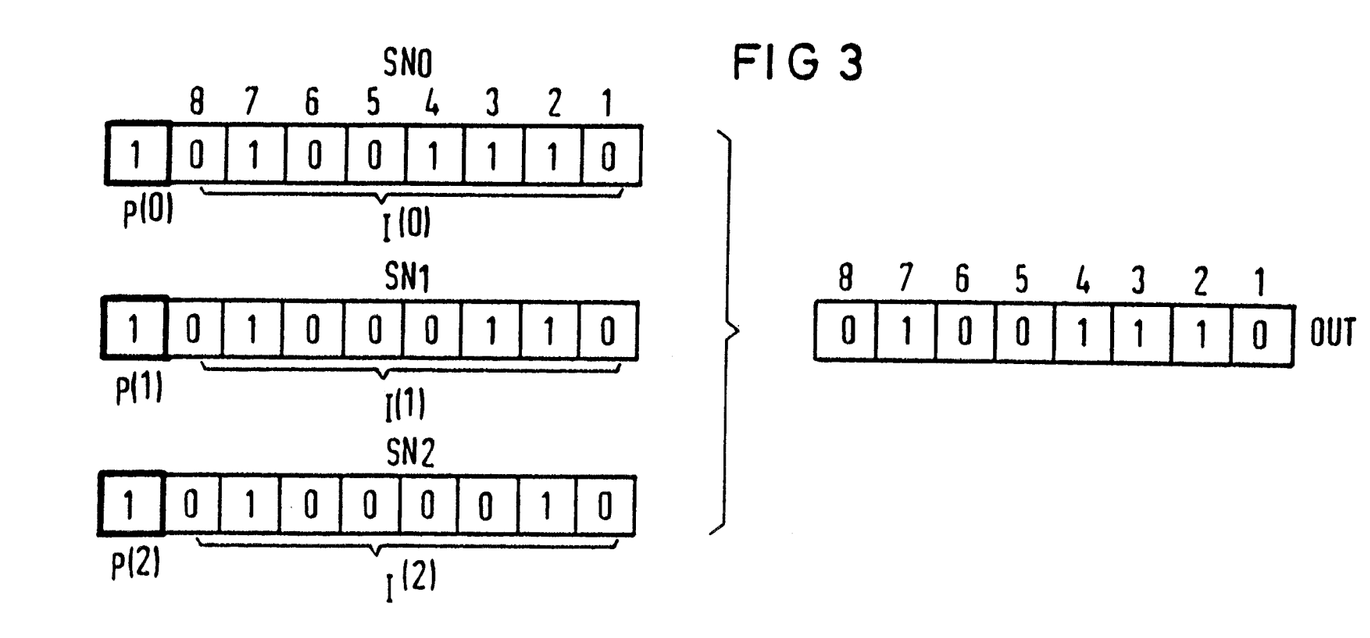
FIG. 3 illustrates a second exemplary transmission of an 8 bit word through the switching levels of the switching network of FIG. 1.
Figure 4:
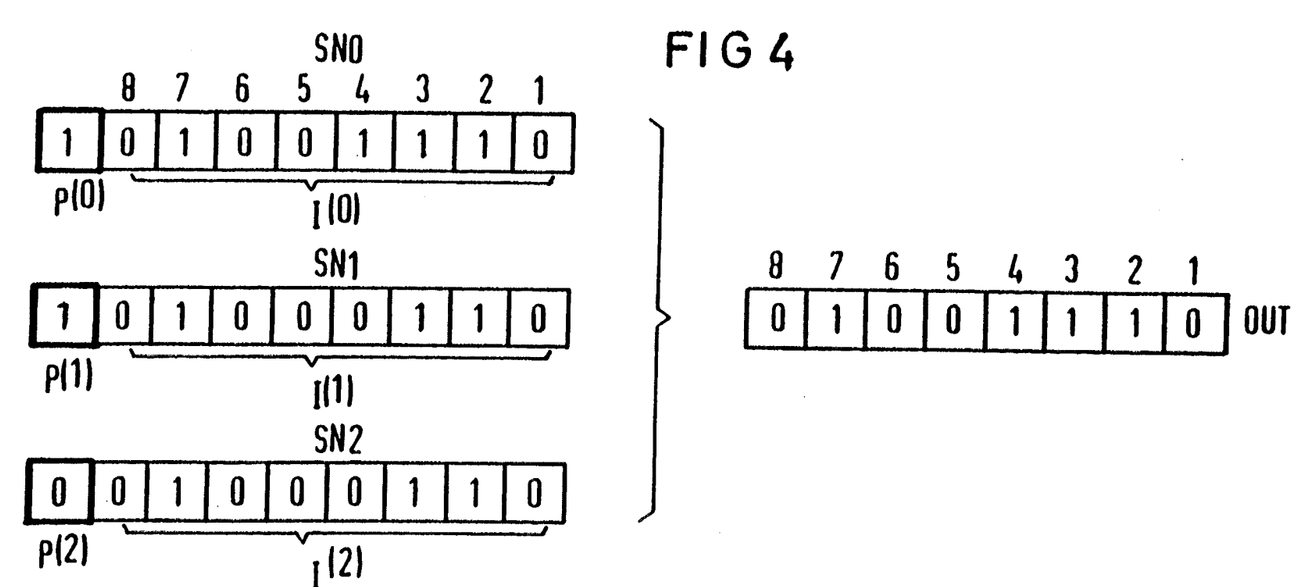
FIG. 4 illustrates a third exemplary transmission of an 8 bit word through the switching levels of the switching network of FIG. 1.

As alluded to above, in the exemplary embodiments illustrated in FIGS. 2, 3 and 4, the information or data words have links of 8 bits. The parity check that is employed is an inverted, binary check sum, ie. the parity bit represents the inverse of the least significant bit of the sum of all of the bits in the associated data word.

In FIG. 2, the situation described above in connection with Case 1 is illustrated. As illustrated in FIG. 2, it is assumed that the fourth bit, ie. bit 4, of each of the data or information words $I^{(1)}$ and $I^{(2)}$ transmitted via the switching network levels SN1 and SN2 respectively, is false or otherwise incorrect. According to the steps of the method of the invention as set forth above, the data or information word $I^{(0)}$ is transmitted to the destination subscriber because the parity of the data word $I^{(0)}$ is consistent with or otherwise matches the parity bit information $p^{(0)}$ transmitted therewith. It can be seen that although the data or information words $I^{(1)}$ and $I^{(2)}$ agree, the parities of these two words are inconsistent with or otherwise do not match their respectively co-transmitted parity bits $p^{(1)}$ and $p^{(2)}$.

In FIG. 3, the situation described in connection with Case 2 above, is presented. Again, it is assumed that bit 4, ie. the fourth bit, of each of the data or information words $I^{(1)}$ and $I^{(2)}$ transmitted across the switching network levels SN1 and SN2, respectively, is false or otherwise incorrect and that bit three, the third bit, of information or data word $I^{(2)}$ is false or otherwise incorrect. As a result, the parity of the data or information word $I^{(2)}$ remains consistent or otherwise in agreement with its co-transmitted parity bit $p^{(2)}$.

According to the method of the invention as described above in connection with Case 2, the forwarding or transmission of either one of the data or information words $I^{(0)}$ or $I^{(2)}$, whose parities are consistent with or otherwise in agreement with their respectively co-transmitted parity bits $p^{(0)}$ or $p^{(2)}$ ensues or occurs depending on the results of the ongoing statistical evaluation procedures f(s). For example, if the bit error rate of the switching network level SN2 was higher in the past than that of the switching network level SN0, then the information word $I^{(0)}$ will be transmitted or otherwise forwarded to the destination subscriber.

In the exemplary embodiment illustrated in FIG. 4, the situation described above in connection with Case 3 is illustrated. Again, it is assumed that bit 4 of each of the data of information words $I^{(1)}$ and $I^{(2)}$ transmitted across the switching network levels SN1 and SN2, respectively, is false or otherwise incorrect, but that the parity bit $p^{(2)}$ co-transmitted with the data word $I^{(2)}$ is also incorrect, as a result of which the parity of the data word $I^{(2)}$ remains consistent with or otherwise in agreement with what would appear to be its co-transmitted false parity bit.

According to the method of the invention, as described above in connection with Case 3, the forwarding of either of the information or data words $I^{(0)}$ or $I^{(2)}$, whose parities are consistent with or otherwise in agreement with their respectively co-transmitted parity bits $p^{(0)}$ and $p^{(2)}$, ensues or occurs pending on the results of the ongoing statistical evaluation procedure f(s). For example, if the bit error rate of the switching network level SN2 was higher in the past than that of the switching network SN0, then the data or information word $I^{(0)}$ will be forwarded or transmitted to the destination subscriber.

It can be appreciated that from the foregoing, that the method of the invention is able to provide a procedure by means of which it is possible to reliably correct a simple error in the transmission of a data word from one line N1 to another line N2 through the switching network S. This is accomplished by either choosing the correct information word $I^{(0)}$, $I^{(1)}$ or $I^{(2)}$ or forming a new output word based on majority decision since this is a property of the majority decision that is employed in such error situations.

Employing the principles of majority decision in combination with the decision algorithm set forth under case 1 above, double errors in the three data or information words $I^{(0)}$, $I^{(1)}$ and $I^{(2)}$ also can be reliably corrected. As a result, a significant reduction of the bit errors occurring in the output to the destination subscriber can be derived. This reduction could not otherwise be obtained by exclusively employing the principle of majority decision.

Yet further, triple errors in the three information or data words $I^{(0)}$, $I^{(1)}$ and $I^{(2)}$ which relate to different bit positions also can be reliably corrected on the basis of majority decision. Of course, when the same bit position of all three data or information words $I^{(0)}$, $I^{(1)}$ and $I^{(2)}$ is false or otherwise incorrect, only an incorrect data word can be output to the destination subscriber. However, if one of the data or information words remains undistorted or is otherwise correct, then the likelihood of the correct data or information word being forwarded to the destination subscriber is high by employing the statistical evaluation procedure f(s) as set forth in connection with Cases 2 and 3 above, despite the simultaneous errors of the same bits in the other two data or information words. It can be seen how this allows a further reduction in the bit errors in the data that is forwarded to the destination subscriber, particularly in situations wherein switching network levels have greatly differing through connection qualities.

In the above described embodiments, the logic elements A, A', B and B' preferably are configured or otherwise implemented in an LSI module-ASIC module. Such modules currently are easily employed and appropriately configured. The employment of such modules also assures that delay times arising in the storage and evaluation of data words are minimized and otherwise are of little consideration for all practical purposes.

As is apparent from the foregoing specification, the invention is susceptible of being embodied with various alterations and modifications which may differ particularly from those that have been described in the preceding specification and description. It should be understood that all such modifications as reasonable and properly, within the scope and contribution of the invention to the art are to be embodied within the scope of the accompanying claims.

I claim:

1. A method for reducing bit errors in a digital communications system having a switching network with at least three switching network levels operatively disposed between interface elements that calculate a check sum both prior to and following switching through of a data word, comprising the steps of:

calculating a check sum for a data word to be through-connected over the network;

forming check sum information for the data word and associating the check sum information with the data word;

providing identical versions of the data word and its associated check sum information to each of the three switching network levels;

through-connecting the three versions in parallel;

calculating a second check sum for each through-connected version of the data word;

comparing each second check sum of each through-connected version of the data word with its respective through-connected check sum information;

acquiring and maintaining statistical information regarding differences between the second check sum of each through-connected version of the data word and its respective through-connected check sum information;

comparing each data bit of each through-connected version of the data word with the respective data bits of the other through-connected versions of the data word; and given only a first through-connected version whose second check sum is in agreement with its through-connected check sum information while the other second and third through-connected versions of the data word are identical but differ with respect to only one data bit from the first through-connected version of the data word, transmitting as an output data word from the switching network that first through-connected version of the data word; otherwise transmitting as an output word of the switching network a composite version of the three through-connected versions of the data word wherein each bit of the composite word is determined by a majority decision of the respective bits of the three versions of the through-connected data word.

2. The method of claim 1, wherein the check sum is a parity check.

3. The method of claim 2, wherein the check sum information is a parity bit.

4. A method for reducing bit errors in a digital communications system having a switching network with at least three switching network levels operatively disposed between interface elements that calculate a check sum both prior to and following switching through of a data word, comprising the steps of:

calculating a check sum for a data word to be through-connected over the network;

forming check sum information for the data word and associating the check sum information with the data word;

providing identical versions of the data word and its associated check sum information to each of the three switching network levels;

through-connecting the three versions in parallel;

calculating a second check sum for each through-connected version of the data word;

comparing each second check sum of each through-connected version of the data word with its respective through-connected check sum information;

acquiring and maintaining statistical information regarding differences between the second check sum of each through-connected version of the data word and its respective through-connected check sum information;

comparing each data bit of each through-connected version of the data word with the respective data bits of the other through-connected versions of the data word; and given only a first through-connected version whose second check sum is in agreement with its through-connected check sum information while the other second and third through-connected versions of the data word are identical but differ with respect to only one data bit from the first through-connected version of the data word, transmitting as an output data word from the switching network that first through-connected version of the data word;

given first and second through-connected versions of the data word whose second check sums are in agreement with their through-connected check sum information but which differ from each other with respect to exactly two data bits and the third through-connected version of the data word differs from each of the two through-connected versions of the data word in one of these two data bits and whose second check sum is inconsistent with its respective through-connected check sum information, transmitting as an output word of the switching network that one of the first and second through-connected versions of the data word whose respective switching network level has exhibited the lowest bit error;

given first and second through-connected versions of the data word whose second check sums are in agreement with their through-connected check sum information but which differ in exactly one data bit position with respect to each other while the third through-connected version of the data word has a second check sum that is inconsistent with its respective through-connected check sum information but is otherwise identical to one of the first and second through-connected versions of the data word, transmitting as an output word of the switching network that one of the first and second versions whose respective switching network level has exhibited the lowest bit error; otherwise transmitting as an output word of the switching network a composite version of the three through-connected versions of the data word wherein each bit of the composite word is determined by a majority decision of the respective bits of the three versions of the through-connected data word.

5. The method of claim 4, wherein the check sum is a parity check.

6. The method of claim 5, wherein the check sum information is a parity bit.

7. A digital communication system having a switching network with at least three switching network levels operatively disposed by the interface elements that calculate a check sum both prior to and following switching through of a data word, the system being operatively configured to effect the following steps:

calculating a check sum for a data word to be through-connected over the network;

forming check sum information for the data word and associating the check sum information with the data word;

providing identical versions of the data word and its associated check sum information to each of the three switching network levels;

through-connecting the three versions in parallel;

calculating a second check sum for each through-connected version of the data word with its respective through-connected check sum information;

acquiring and maintaining statistical information regarding differences between the second check sum of each through-connected version of the data word and its respective through-connected check sum information;

comparing each data bit of each through-connected version of the data word with the respective data bits of the other through-connected versions of the data word; and given only a first through-connected version whose second check sum is in agreement with its through-connected check sum information while the other second and third through-connected versions of the data word are identical but differ with respect to only one data bit from the first through-connected version of the data word, transmitting as an output data word from the switching network that first through-connected version of the data word; otherwise transmitting as an output word of the switching network a composite version of the three through-connected versions of the data word wherein each bit of the composite word is determined by a majority decision of the respective bits of the three versions of the through-connected data word.-

8. The system of claim 7, wherein the check sum is a parity check.

9. The system of claim 7, wherein the check sum information is a parity bit.

10. A digital communication system having a switching network with at least three switching network levels operatively disposed by the interface elements that calculate a check sum both prior to and following switching through of a data word, the system being operatively configured to effect the following steps:

calculating a check sum for a data word to be through-connected over the network;

forming check sum information for the data word and associating the check sum information with the data word;

providing identical versions of the data word and its associated check sum information to each of the three switching network levels;

through-connecting the three versions in parallel;

calculating a second check sum for each through-connected version of the data word;

comparing each second check sum of each through-connected version of the data word with its respective through-connected check sum information;

acquiring and maintaining statistical information regarding differences between the second check sum of each through-connected version of the data word and its respective through-connected check sum information;

comparing each data bit of each through-connected version of the data word with the respective data bits of the other through-connected versions of the data word; and given only a first through-connected version whose second check sum is in agreement with its through-connected check sum information while the other second and third through-connected versions of the data word are identical but differ with respect to only one data bit from the first through-connected version of the data word, transmitting as an output data word from the switching network that first through-connected version of the data word;

given first and second through-connected versions of the data word whose second check sums are in agreement with their through-connected check sum information but which differ from each other with respect to exactly two data bits and the third through-connected version of the data word differs from each of the two through-connected versions of the data word in one of these two data bits and whose second check sum is inconsistent with its respective through-connected check sum information, transmitting as an output word of the switching network that one of the first and second through-connected versions of the data word whose respective switching network level has exhibited the lowest error;

given first and second through-connected versions of the data word whose second check sums are in agreement with their through-connected check sum information but which differ in exactly one data bit position with respect to each other while the third through-connected version of the data word has a second check sum that is inconsistent with its respective through-connected check sum information but is otherwise identical to one of the first and second through-connected versions of the data word, transmitting as an output word of the switching network that one of the first and second versions whose respective switching network level has exhibited the lowest bit error; otherwise transmitting as an output word of the switching network a composite version of the three through-connected versions of the data word wherein each bit of the composite word is determined by a majority decision of the respective bits of the three versions of the through-connected data word.

11. The system of claim 10, wherein the check sum is a parity check.

12. The system of claim 10, wherein the check sum information is a parity bit.

* * * * *